Dec. 4, 1956 C. A. HULCHER 2,772,941
HIGH SPEED SEQUENCE CAMERA
Filed May 19, 1952 5 Sheets-Sheet 1
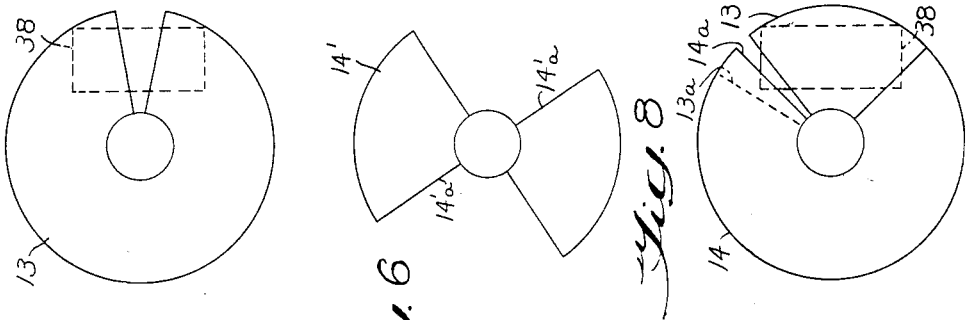
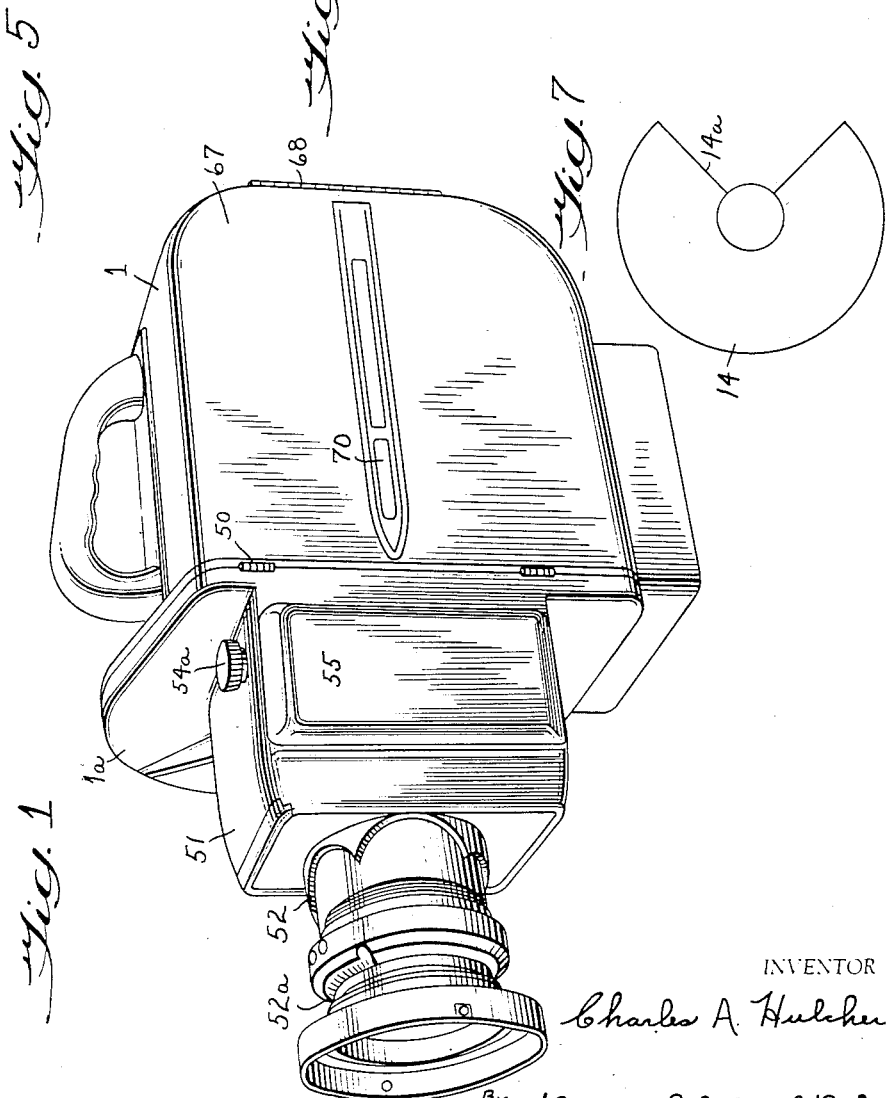
INVENTOR
Charles A. Hulcher
By Pierce, Scheffler & Parker
ATTORNEYS

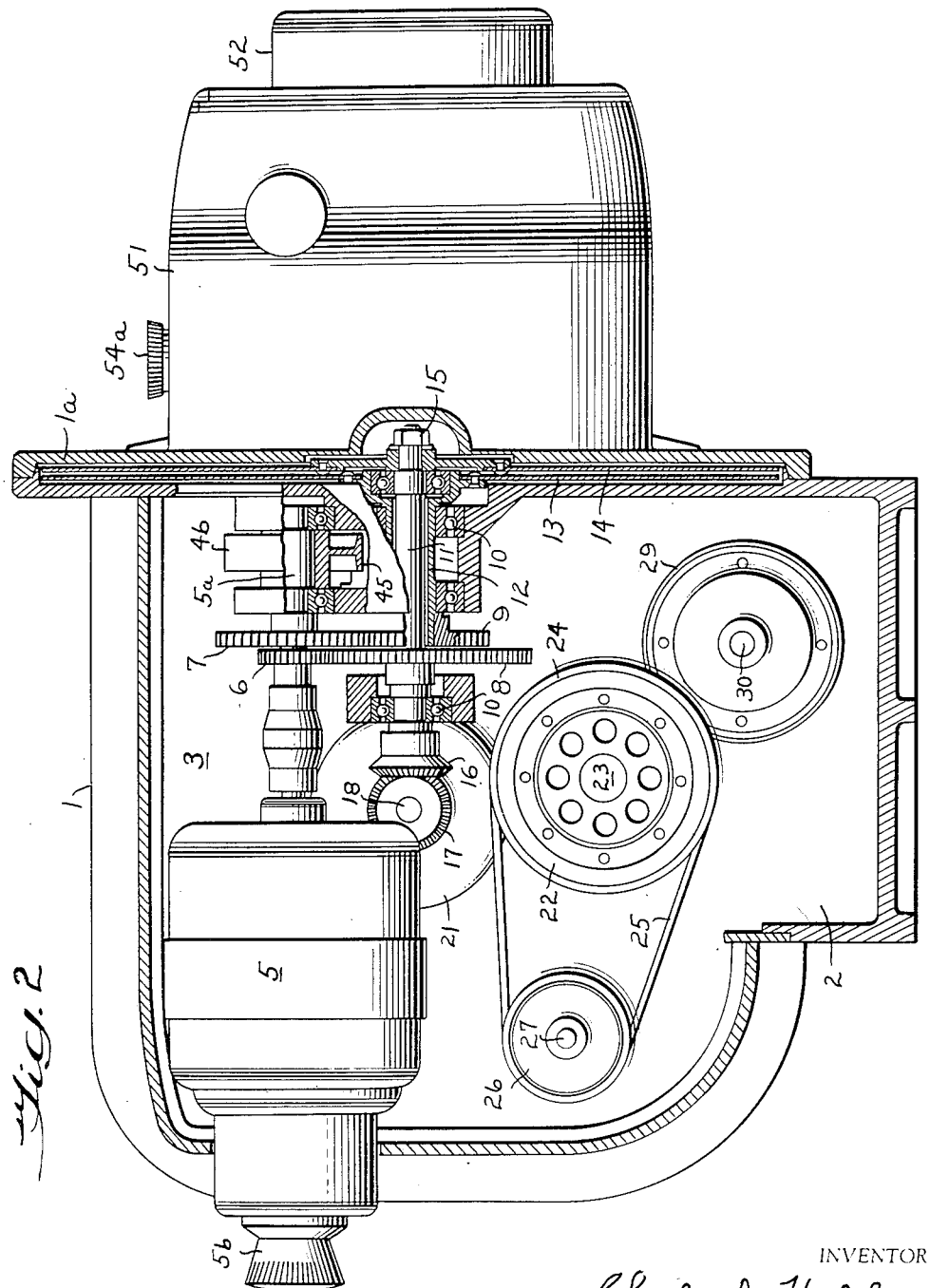

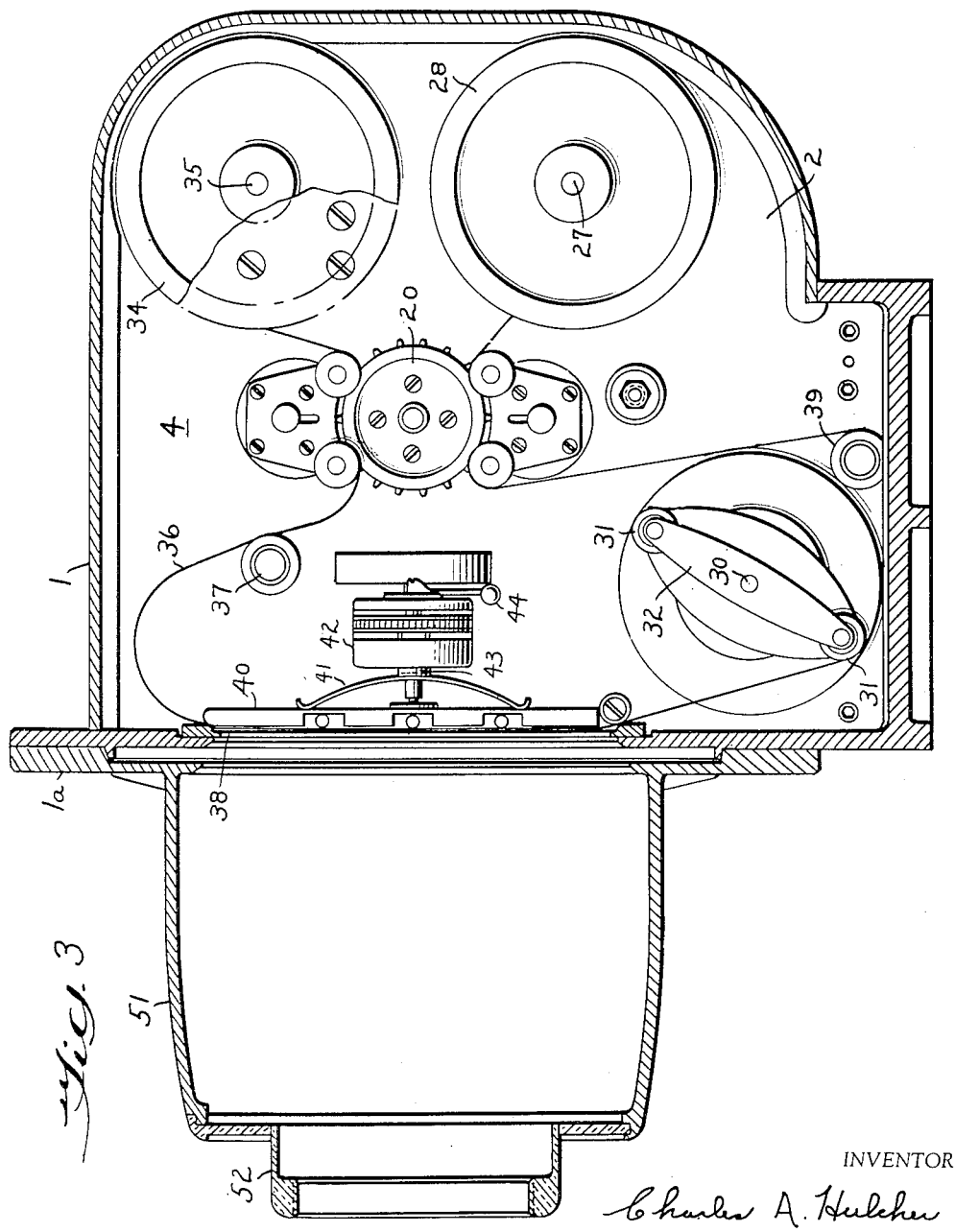

Dec. 4, 1956 C. A. HULCHER 2,772,941
HIGH SPEED SEQUENCE CAMERA
Filed May 19, 1952 5 Sheets-Sheet 4
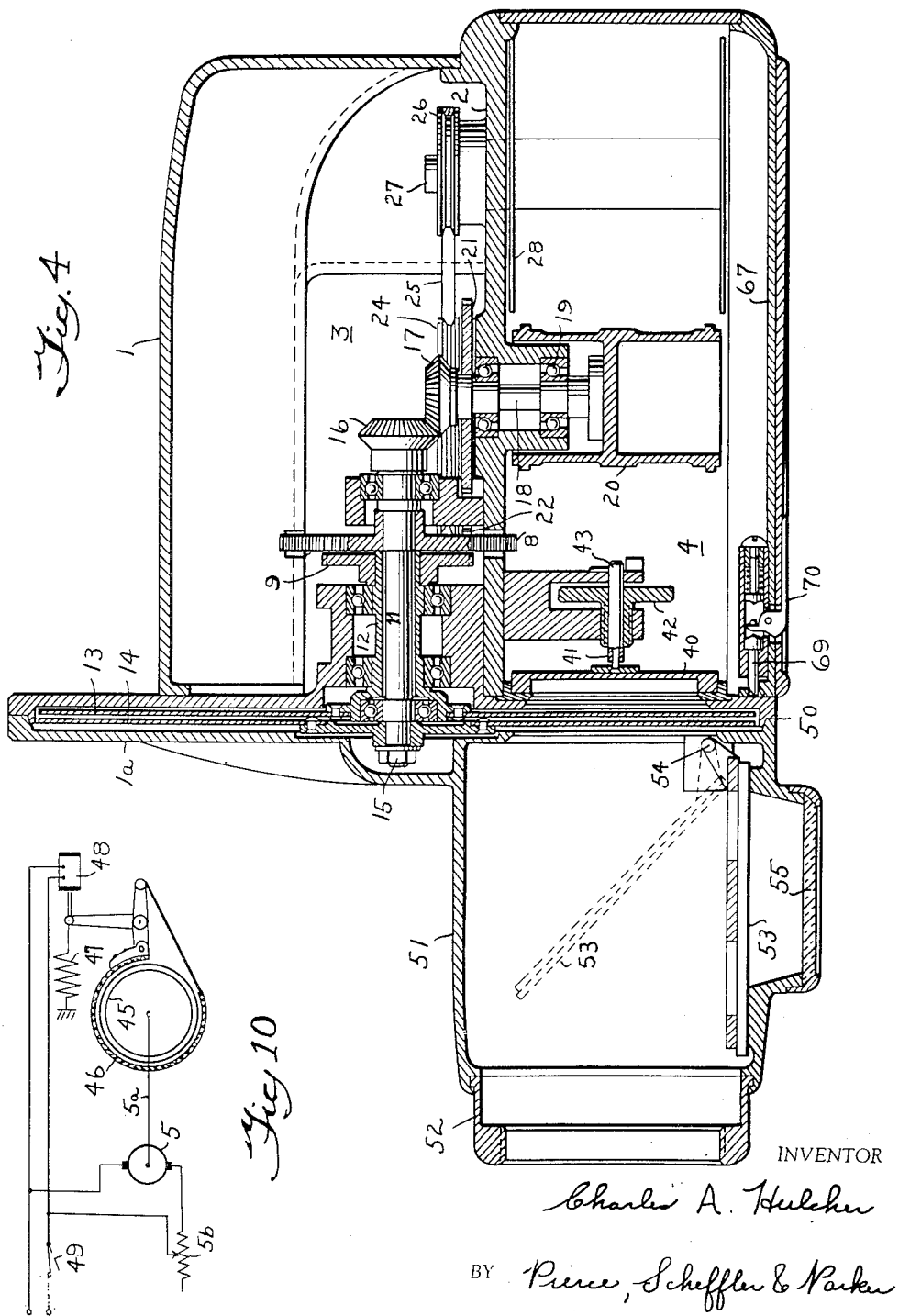
INVENTOR
Charles A. Hulcher
BY Pierce, Scheffler & Parker
ATTORNEYS

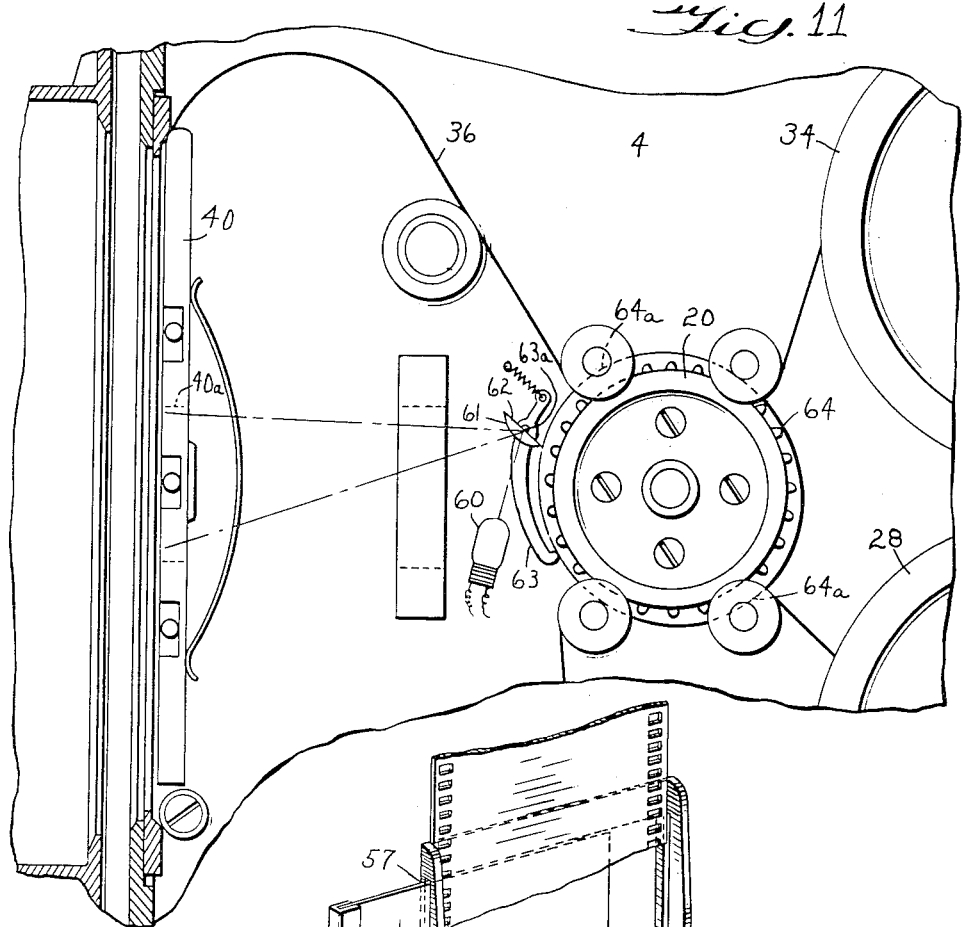
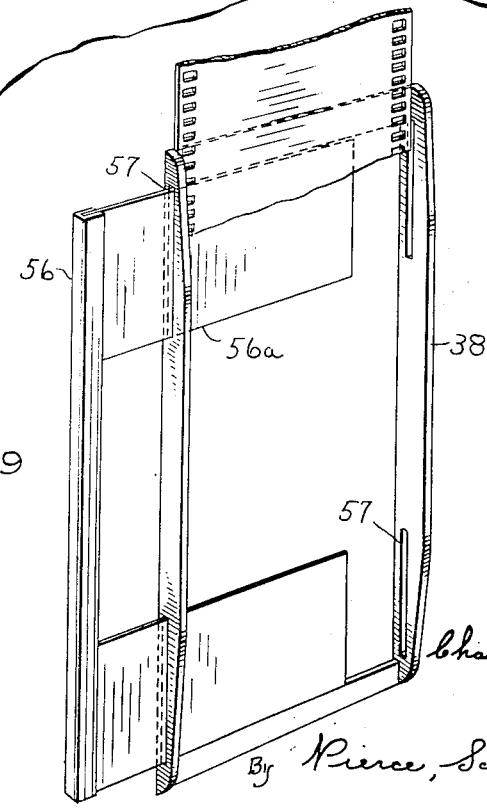

United States Patent Office 2,772,941
Patented Dec. 4, 1956

2,772,941

HIGH SPEED SEQUENCE CAMERA

Charles A. Hulcher, Hampton, Va.

Application May 19, 1952, Serial No. 288,637

3 Claims. (Cl. 346—107)

The present invention relates to cameras of the sequence type and has for its principal object to provide an improved construction which enables one to take a series of very large pictures at a relatively high speed. The camera is ideally suited for recording high altitude aircraft flights, wind tunnel data, aerial reconnaissance, news or sports or any assignment where exacting details are needed in high sequence speeds. The pictures taken are as large as stills and have a sequence speed as great or greater than conventional motion pictures. The particular embodiment of the invention to be described is capable of taking at least fifty 2½″ or twenty-five 5″ pictures on a strip of film seventy millimeters wide and hence enables one to obtain excellent details on negatives large enough to print by contact. Sequence cameras are not broadly new but to applicant's knowledge all operate with very small film which must be enlarged after exposure and hence suffer from loss of detail in the negaitve inherent in the enlarging process.

Another object of the invention is to provide a sequence camera which features only rotating movable parts thus minimizing vibration and wear as opposed to the more conventional structure which includes reciprocating parts such as the claw-type film pull-down which actually induces vibration and leads to image distortion.

Another object is to provide a camera of the type described in which there is a minimum of film wastage between successive "shots," this being attained through use of braking means actuated simultaneously with de-energization of the electric driving motor to thus bring all moving parts including the film feeding sprocket and the film feeding and takeup spools to a quick stop.

Yet a further object is to provide for placing timing and synchronizing marks on the film while at the film gate therefore making it much easier to read up data from the pictures taken.

A further object is to provide a camera which will give long, hard service with a minimum of maintenance and which requires no special training to service and operate.

The foregoing objects and advantages will become more apparent from the following detailed description of a preferred embodiment of the invention when considered with the accompanying drawings in which:

Fig. 1 is a view in perspective of the camera;

Fig. 2 is a vertical, central longitudinal section as seen from the motor side;

Fig. 3 is a view similar to Fig. 2 as seen from the film compartment side;

Fig. 4 is a horizontal longitudinal section;

Figs. 5, 6, 7 and 8 are views of the shutter mechanism;

Fig. 9 is a perspective view of the film gate and mask;

Fig. 10 is a schematic electrical diagram showing the circuit interconnecting the motor and brake control; and Fig. 11 is a fragmentary view showing a modified construction which includes a device for placing timing marks on the film strip.

With reference now to the drawings, the camera body is comprised of a casing 1 divided longitudinally by a central vertical wall 2 into two compartments 3 and 4. Compartment 3 contains the driving motor and associated drive mechanisms for the film spooling, film pull-down and shutter mechanisms and compartment 4 contains the film spools, sprockets for feeding the film, film gate, pull-down and timing device.

Fig. 2 shows the motor compartment which contains a small electric motor 5 which is adapted to run off any conventional source of voltage such as 110 volts, A. C. or D. C. This motor has a top running speed of 6,000 R. P. M. and its speed can be varied by any suitable means such a built in centrifugal governor or as more simply illustrated a built-in rheostat 5b. Motor 5 drives gears 6 and 7 which mesh respectively with gears 8 and 9. Gears 8 and 9 are mounted concentrically in anti-friction bearings 10 and are secured respectively to a pair of concentrically mounted shafts 11, 12. One shutter 13 is attached permanently to the outer shaft 12 and a second shutter 14 is removably attached to the inner shaft 11 by means of a nut 15.

Meshed gears 7 and 9 are of the same diameter and hence gear 9 will turn the outer shaft 12 and hence shutter 13 at the motor speed. On the other hand, gear 8 has a diameter four times that of gear 6 and hence the inner shaft 11 will rotate shutter 14 at only one-fourth the motor speed. Thus shutter 14 will rotate at one-fourth the speed of shutter 13 and in the same direction. As seen in Fig. 7 shutter 14 is provided with a circumferential gap 14a extending over an arc of 90° and this shutter is used for taking pictures 5″ long. The other shutter 14′ shown in Fig. 6 is provided with two circumferential gaps 14′a each extending over 90° of arc and spaced 180° apart. This shutter is substituted for shutter 14 when taking pictures 2½″ long. Shutter 13 shown in Fig. 5 has a circumferential gap 13a extending over an arc of 21°.

The opposite end of shaft 11 has mounted thereon a bevelled gear 16 which meshes with a second bevelled gear 17 that is mounted on a shaft 18 which is journalled in antifriction bearings 19. Shaft 18 extends through the dividing wall 2 into compartment 4 and mounts the film driving sprocket 20. Also mounted upon shaft 18 in compartment 3 is another gear 21 which meshes with gear 22 mounted on shaft 23. Gear 22 is provided with a sheave 24 that drives a belt 25 which in turn drives a sheave 26 mounted on shaft 27 that likewise extends through wall 2 into compartment 4 and drives a film take-up spool 28 mounted thereon.

Gear 22 also meshes with a gear 29 which is mounted on shaft 30 also extending through wall 2 into compartment 4 and which drives the film pull-down or beater consisting of a pair of rollers 31 mounted 180° apart in a frame 32 and which are adapted to engage the film in succession as the frame 32 is rotated.

The film to be exposed is carried by a spool 34 mounted freely upon shaft 35. As seen in Fig. 3, the course of the film 36 when threaded in the camera runs off the bottom of spool 34 over the top of feed sprocket 20, over guide roller 37 to the top of the film gate 38, downwardly through this gate, past the beater rollers 31, around guide roller 39, upwardly and thence under sprocket 20 and finally onto the take-up spool 28.

The film gate 38 has associated with it the usual pressure plate 40 which is urged against the film by a bowed leaf spring 41. The pressure which this spring exerts against the plate can be varied by rotation of drum 42 which engages the spring and is threaded upon shaft 43 for displacement axially. To release the pressure plate 40 from the film as is done when threading up a new roll of film, a lever 44 is provided and which, when it is actuated, retracts the shaft 43 and pressure plate 40 away from the film gate.

Access to compartment 4 for loading and unloading film is gained through a side door 67 hinged to the rear of the casing at 68, the door being held in closed position by means of a spring latch 69 controlled by a pivoted lever 70.

To prevent undue wastage of film, the drive mechanism in accordance with the present invention is provided with a braking device which is arranged to take hold each time the motor is disconnected from its source of power. This braking device, shown in Figs. 2 and 10, is comprised of a drum 45 attached to the motor shaft 5a and a brake band 46 loaded into frictional engagement with the drum 45 by means of a spring 47. When motor 5 is energized by closing switch 49, a solenoid 48 is likewise energized and the armature element thereof functions to move the band 46 away from the drum 45 thus releasing the brake from the drive mechanism. When motor 5 is deenergized at the end of a picture taking sequence, solenoid 48 becomes deenergized and spring 47 draws the band 46 against drum 45 thereby applying the brake and bringing the film to a quick stop.

As seen in Figs. 1 and 4, the front wall 1a of the camera casing 1 which encloses the shutters 13, 14 is hinged along the side wall at 50 to provide access to the shutters. This is necessary in this particular embodiment since it will be remembered that shutter changes are necessary when switching from a 5" picture to a 2½" picture or vice versa. With the front casing wall 1a swung back on its hinges the entire shutter space is exposed and shutter changes may be made quickly and easily by removing the nut 15 which retains shutter 14 in place.

Also carried by the front wall 1a is a casing 51 which encloses the focussing device and carries at its forward end a lens mount 52 for attachment of any particularly desired lens 52a dependent upon the picture requirement. The focussing device is comprised of a reflecting mirror 53 mounted on a hinge 54 at the side adjacent the shutters. The pintle extends through the casing, terminating in a knob 54a that enables the user to move the focussing mirror from the normal position, shown in solid lines, when pictures are being taken, to the broken line position when focussing is desired. When focussing, the surface of mirror 53 lies across the optical axis at an angle of 45° to such axis and hence light received by the lens will be deflected laterally onto a ground glass viewer 55. After the camera has been focussed, mirror 53 is moved out of the optical path to its position flat against the side wall of casing 51 where it seals the latter against entrance of any stray light coming through the ground glass viewer 55.

As seen in Fig. 4, shutters 13, 14 are located immediately adjacent the film gate and hence operate at the focal plane. As previously explained, the beater rollers 31 engage the film strip 36 in succession in an intermittent manner whereas the feed sprocket 20 feeds the film continuously from the spool 34 and onto the take-up spool 28 at a uniform speed. With the present embodiment, 5 1/16" of film is pulled past the film gate 38 for each revolution of sprocket 20. The beater rollers 31 rotate at the same speed as sprocket 20 and hence the film strip 36 will be stopped twice for each 5 1/16" that is pulled through the gate. That is, a dwell period is established at the end of approximately each 2½" of film pull-down by the rollers 31 as the latter engage the film loop beneath the film gate. This dwell period is long enough for the opening in shutter 13 to pass the entire length of the film gate. Shutter 14 rotates at only one fourth the speed of shutter 13 and since its angular opening extends for 90°, the film 36, when taking a 5" picture, will be exposable by the cut-out portion 13a of shutter 13 only once in every four revolutions of shutter 14.

During the next three revolutions of shutter 13 the film 36 will have moved 5" so that another 5" picture can be taken and during this film movement, light to the film is blocked off by the 270° opaque sector of shutter 14. When taking a 2½" picture, a mask 56 having a cut out portion 56a 2½" long is inserted in a slot 57 in the film gate to mask off 1¼" of the film at the top of the gate and a like length at the bottom of the gate. As previously explained, for taking 2½" pictures, the shutter 14' is utilized. This shutter has two 90° openings 14'a spaced 180° apart and hence the film 36 will be exposable by the cut-out portion 13a of shutter 13 once for each two revolutions of shutter 14.

This double shutter arrangement, that is shutters 13, 14 or 13, 14' is quite advantageous since it enables one to reduce the shutter diameter to a comparatively small dimension and yet maintain normal requirements as to exposure time and film speed. The embodiment herein described taking twenty-five 5" or fifty 2½" pictures per second provides a film exposure of one seventeen-hundredth of a second. Even at relatively slow frame speeds, the shutter is able to stop the action without distorting the image. Were a single shutter 13 to be utilized and the same exposure time and film speed maintained it is obvious that the diameter of the shutter would have to be greatly enlarged thus increasing the overall size of the camera to a point where much of its attractiveness, based upon low weight and small size would be lost. Use of a single shutter 13 of the same size and high speed, the latter being necessary to stop the action, would of course require a great increase in film i. e. frame speed but this would be extremely wasteful of film since the present embodiment offering twenty-five 5" pictures or fifty 2½" pictures is fast enough to meet most applications.

The double shutter arrangement as described above is however the joint invention of the present applicant and Numa E. Thomas and is claimed in a separate co-pending application Serial No. 286,548 filed May 7, 1952.

Another feature of the invention is the provision of timing and synchronization marks on the film. Such marks are frequently required to complete data obtained with photographic cameras utilizing intermittent film motion. Timing marks are usually indicated in the form of coded dots on one edge of the film. Since the film is stationary while each picture is being photographed and since timing marks are frequently required at speeds up to .001 of a second, it has not heretofore been possible to place the timing marks directly beside the picture since they would fall on top of one another while the film is stationary. It has therefore been necessary to record timing marks on the film at some point in the camera mechanism where the film is traveling at a constant rate such as a sprocket before or after picture exposure. In reading up data from such records it is necessary to compute the distance between the actual picture and the point on the film where the timing marks are placed. This procedure is extremely difficult because of the continual difference in the length of the film between the picture and the timing marks exposed at the same instant. This difference results from the changing length of the film loop between the sprocket and the exposure aperture and the usual differences occasioned in threading the camera. The device now to be described makes it possible to record timing marks directly upon the picture and along its entire length indicating exactly the time each portion of the picture was exposed.

With reference now to Fig. 11, a small timing lamp 60 of the argon or neon type mounted within compartment 4 forward of the film sprocket 20 is adapted for connection to an exterior power source (not shown) which provides electrical pulses at the frequency required such as for example per second. Being of the argon or neon type, lamp 60 flashes on and off instantaneously at each pulse. Light from lamp 60 is directed through lens 61 and is reflected by means of a mirrored surface 62 on the back of this lens to the film 36 through a slot 40a in the pressure plate. Lens 61 is of the proper focal length to project a small concentrated point on the back of the film which in turn penetrates the film and exposes the emulsion. The combination lens-mirror 61—62 is carried on cam follower 63 and the latter is pivotally mounted at 63a, it being noted that the center line of the lens is on the rotational axis of cam follower 63. A cam 64 is mounted on the inner end of sprocket 20 in such manner as to clear the film 36 and rotates with the sprocket. This cam is designed in such manner as to cause cam follower 63 to rock the lens-mirror 61—62 which in turn deflects the light beam produced by lamp 60 up and down in the slot 40a. The contour of cam 64 is such that it will cause the light beam to travel upwardly during the period that the film is stationary at exactly the same speed the film is passing over sprocket 20 and will reach the top of slot 40a at the same time the film is again started in motion, at which time it will cause the light beam to start downwardly along slot 40a at precisely the proper speed to compensate for the acceleration of the film caused by the beater rollers 31. In the illustrated embodiment since there are two rollers 31, cam 64 will have two lobes 64a located opposite each other and is symmetrical about its center line since the beater rollers 31 and cam 64 rotate at the same speed. Timing marks will be produced on the film 36, the marks being equally spaced in exactly the same manner as usually obtained by exposing these marks at the sprocket except that they will, by means of this device, be placed directly opposite the picture thus eliminating costly and uncertain computations previously necessary in the reduction of photographic data.

In conclusion, it is to be understood that while the specific embodiment illustrated is to be preferred, various changes may be made in the details of construction without however departing from the spirit and scope of the invention as defined in the appended claims.

I claim:

1. In a sequence camera comprising a casing, strip film feeding and film take-up means within said casing operated at constant speed, a film gate through which said film passes and means intermittently engaging said film for effecting intermittent pull down of said film through said film gate and with a period of dwell between successive pull downs, the improvement which resides in means for establishing timing marks on said film, said means including a light source providing light pulses at a predetermined repetition rate and means actuated in timed relation with said film pull down means for sweeping the light pulses emitted from said light source longitudinally back and forth along said strip film at said film gate, the sweep of said light pulses during the dwell period between successive pull downs being in the direction opposite to that traveled by the film and in the same direction as that traveled by the film during the pull down.

2. A device for establishing timing marks on strip film in a sequence camera as defined in claim 1 wherein said source of light pulses is stationary and the means for sweeping the pulses along the strip film is comprised of a mirror disposed in the optical path between said light source and film, means mounting said mirror pivotally so as to deflect the light pulses, and means actuated in timed relation with said film pull down means for oscillating said mirror about its pivot axis.

3. A device for establishing timing marks on strip film as defined in claim 2 wherein the means for oscillating said mirror is comprised of a cam driven by said film feeding means and a cam follower coupled to said mirror.

References Cited in the file of this patent

UNITED STATES PATENTS

| 1,056,878 | Aspinwall et al. | Mar. 25, 1913 |
| 1,847,987 | Semel | Mar. 1, 1932 |
| 2,458,882 | Stoner et al. | Jan. 11, 1949 |
| 2,569,031 | Warner et al. | Sept. 25, 1951 |

FOREIGN PATENTS

| 314,914 | Great Britain | July 5, 1929 |

OTHER REFERENCES

"The Review of Scientific Instruments," vol. 19, No. 11, November 1948, pps. 805–807.